(12) United States Patent
Bauer et al.

(10) Patent No.: US 8,910,518 B2
(45) Date of Patent: Dec. 16, 2014

(54) SELF-TEST FOR YAW RATE SENSORS

(75) Inventors: Wolfram Bauer, Tuebingen (DE);
Johannes Classen, Reutlingen (DE);
Rainer Willig, Tamm (DE); Matthias Meier, Reutlingen (DE); Burkhard Kuhlmann, Reutlingen (DE); Mathias Reimann, Ditzingen (DE); Ermin Esch, Pliezhausen (DE); Hans-Dieter Schwarz, Balingen (DE); Michael Veith, Reutlingen (DE); Christoph Lang, Cupertino, CA (US); Udo-Martin Gomez, Leonberg (DE)

(73) Assignee: Robert Bosch GmbH, Stuttgart (KR)

( * ) Notice: Subject to any disclaimer, the term of this patent is extended or adjusted under 35 U.S.C. 154(b) by 385 days.

(21) Appl. No.: 13/266,408

(22) PCT Filed: Apr. 6, 2010

(86) PCT No.: PCT/EP2010/054479
§ 371 (c)(1),
(2), (4) Date: Feb. 6, 2012

(87) PCT Pub. No.: WO2010/133394
PCT Pub. Date: Nov. 25, 2010

(65) Prior Publication Data
US 2012/0186345 A1    Jul. 26, 2012

(30) Foreign Application Priority Data

May 19, 2009  (DE) .......................... 10 2009 003 217

(51) Int. Cl.
*G01C 19/00*    (2013.01)
*G01C 19/5726*    (2012.01)
(52) U.S. Cl.
CPC ................... *G01C 19/5726* (2013.01)
USPC ........................................... 73/504.12

(58) Field of Classification Search
USPC ........................................... 73/504.12
See application file for complete search history.

(56) References Cited

U.S. PATENT DOCUMENTS 5,703,292 A * 12/1997 Ward .......................... 73/504.02
6,672,159 B2 * 1/2004 Schmid et al. ............. 73/504.12
(Continued)

FOREIGN PATENT DOCUMENTS

DE      44 47 005      7/1996
DE      198 53 063     5/1999
(Continued)

*Primary Examiner* — Hezron E Williams
*Assistant Examiner* — Mark A Shabman
(74) *Attorney, Agent, or Firm* — Kenyon & Kenyon LLP

(57) ABSTRACT

A yaw rate sensor (10) includes a movable mass structure (12) and a drive component (13) which is suitable for setting the movable mass structure (12) in motion (14), and an analysis component (15) which is suitable for detecting a response (40) of the movable mass structure (12) to a yaw rate ($\Omega$). A method for functional testing of a yaw rate sensor (10) includes the following steps: driving a movable mass structure (12), feeding a test signal (42) into a quadrature control loop (44) at a feed point (48) of the quadrature control loop (44), feeding back a deflection (40) of the movable mass structure (12), detecting a measure of the feedback of the movable mass structure (12), and reading out the response signal (47) from the quadrature control loop (44). In the yaw rate sensor (10) and also in the method, the readout of the response signal (47) in relation to a processing direction (45) of the test signal (42) is provided between a feed point (48) for a test signal (42) and an actuator (38) for feeding back a deflection (40) of the movable mass structure (12).

12 Claims, 3 Drawing Sheets

(56) References Cited

U.S. PATENT DOCUMENTS

| | | |
|---|---|---|
| 7,523,663 B2 * | 4/2009 | Willig et al. ............... 73/504.12 |
| 2003/0121307 A1 * | 7/2003 | Schmid et al. ................ 73/1.77 |
| 2005/0091006 A1 * | 4/2005 | Rober .......................... 702/189 |
| 2009/0114016 A1 | 5/2009 | Nasiri et al. |

FOREIGN PATENT DOCUMENTS

| | | |
|---|---|---|
| DE | 10 2005 004 775 | 8/2006 |
| JP | 2000-146590 | 5/2000 |
| JP | 2006-515423 | 5/2006 |

* cited by examiner

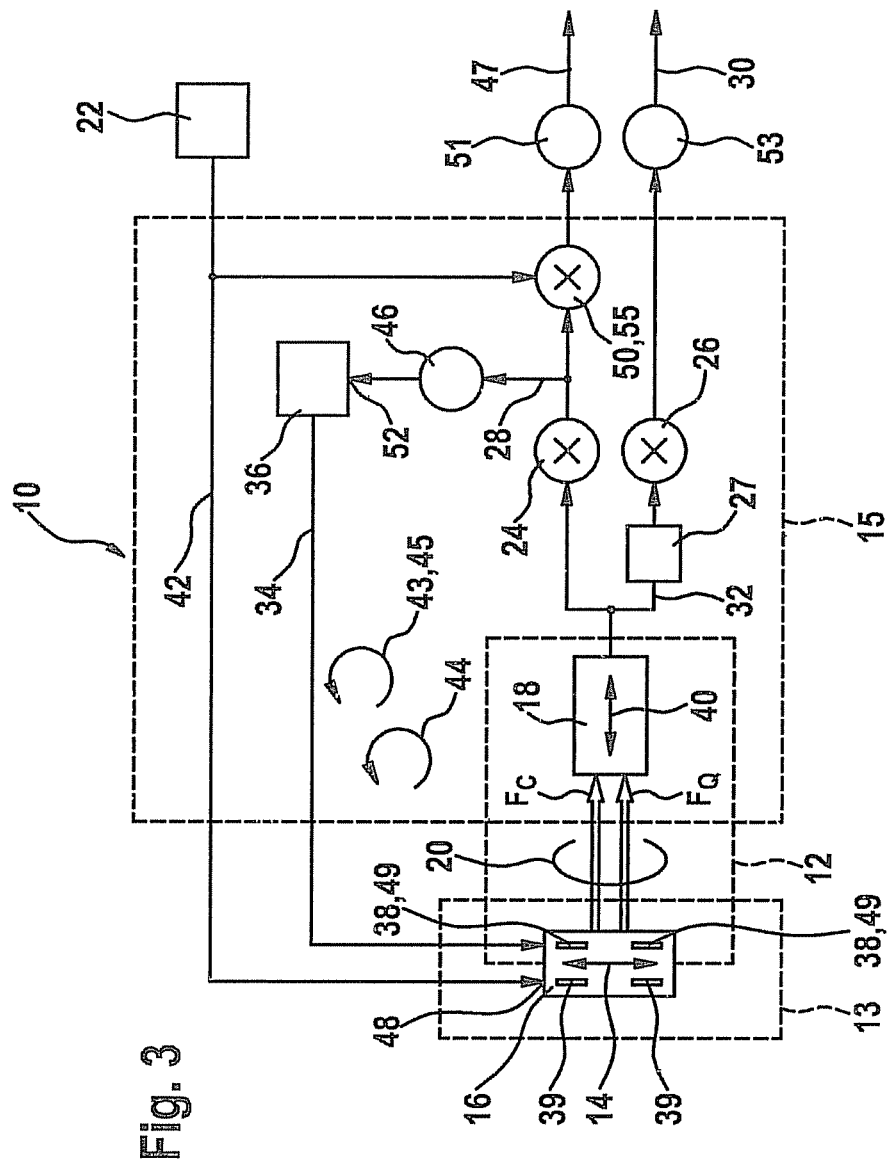

SELF-TEST FOR YAW RATE SENSORS

BACKGROUND OF THE INVENTION

1. Field of the Invention

The present invention relates to multiple yaw rate sensors, each yaw rate sensor including a movable mass structure, a drive component, and an analysis component, the drive component being suitable for setting and/or keeping the movable mass structure in motion, and the analysis component being suitable for detecting a response of the movable mass structure to a yaw rate. Moreover, the present invention relates to multiple methods for functional testing of a yaw rate sensor, each method including the following steps: driving a movable mass structure, feeding a test signal into a quadrature control loop at a feed location of the quadrature control loop, feeding back a deflection of the movable mass structure, detecting a measure of the feedback of the movable mass structure, and reading out a response signal from the quadrature control loop.

2. Description of Related Art

In a conventional sensor, such as that described in published German patent application document DE 10 2005 004 775 A1, a readout location for a response signal (in response to the test signal) is situated between an actuator for feeding back a deflection of the movable mass structure and a feed location for the test signal. In the conventional sensor it is disadvantageous that a section of the quadrature control loop between the feed location and the readout location is not detected by the functional testing.

BRIEF SUMMARY OF THE INVENTION

An object of the present invention is to provide improved functional testing. The object is achieved using the yaw rate sensor, and using the method. This advantage is achieved in that a readout location for a response signal in relation to a processing direction of the test signal is situated between a feed location for a test signal and an actuator for feeding back a deflection of the movable mass structure.

In another specific embodiment, for applying the test signal to the movable mass structure different actuators, in particular different electrodes, are provided than for a quadrature compensation. The complexity is reduced in this way.

In another design, a test signal is used which results in a response signal which is essentially mean-value-free. Offset errors may be avoided in this way.

Another specific embodiment provides that a relationship between a level of the test signal and a level of the response signal which is brought about by the test signal via a processing path of the test signal is linear. Offset errors may be avoided in this way.

In another specific embodiment, it is provided that the response signal is read out in relation to a processing direction of the test signal between the feed location and a location of the feedback of the movable mass structure. This allows all sections of the quadrature control loop to be checked.

In another specific embodiment, a significant portion of a power spectrum of the response signal is above a bandwidth of an output filter for yaw rate information. Crosstalk between the test signal and the useful signal may be reduced in this way.

In another specific embodiment, a significant portion of a power spectrum of the response signal is above a bandwidth of the quadrature control loop. Crosstalk between the test signal and the useful signal is also improved in this way.

In another specific embodiment, a frequency of the test signal is less than an inverse control time constant of the quadrature control loop. The accuracy of the functional testing may be improved in this way.

In another specific embodiment, the test signal has a sinusoidal curve. Electromagnetic interferences are reduced in this way.

In another specific embodiment, the test signal is dosed corresponding to an inverse operating point dependency of the quadrature control loop. Variability of the signal-to-noise ratio is reduced in this way.

The present invention is explained based on particularly preferred specific embodiments, with reference to the accompanying figures.

BRIEF DESCRIPTION OF THE DRAWINGS

FIGS. 1 through 3 show schematic block diagrams of first through third specific embodiments of a yaw rate sensor according to the present invention.

DETAILED DESCRIPTION OF THE INVENTION

Figure 1:
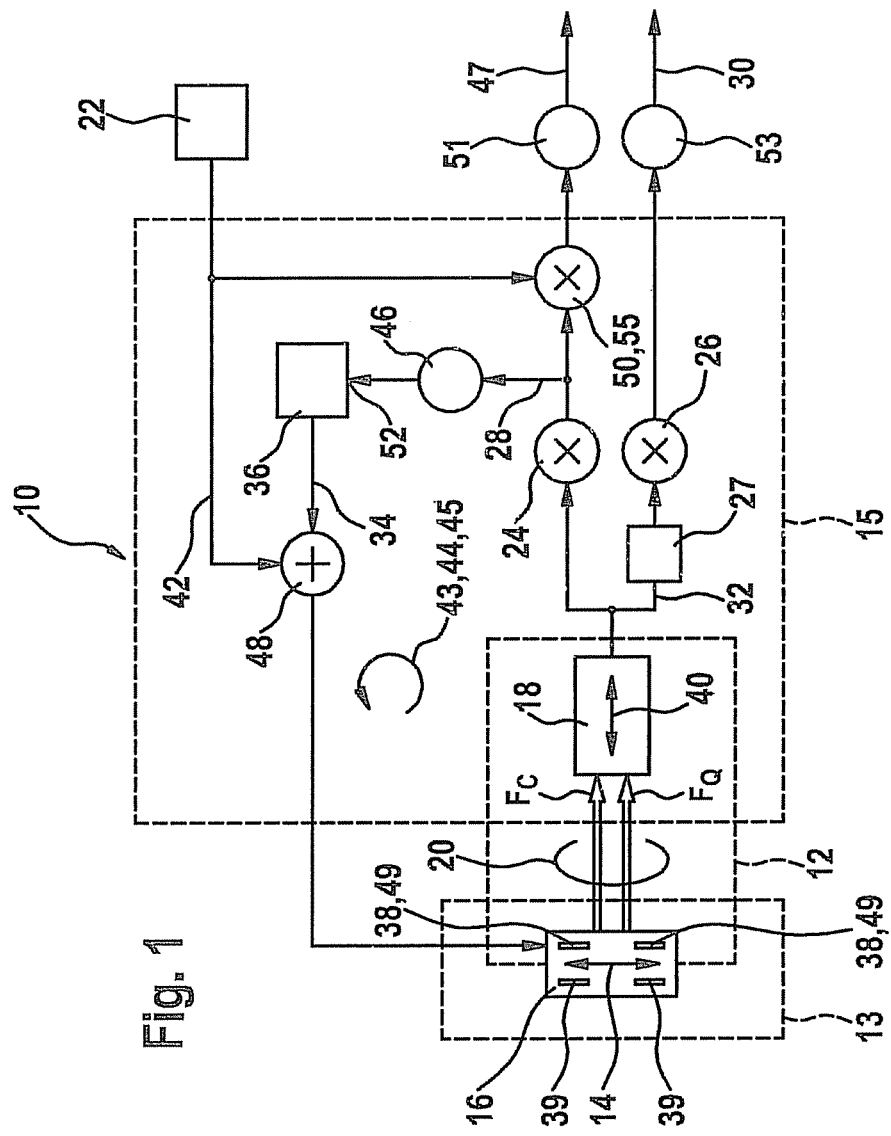

In a micromechanical yaw rate sensor 10 (vibration gyrometer), use is made of the Coriolis effect for determining an external yaw rate $\Omega$. For this purpose, a movable mass structure 12 of sensor 10 is set in motion at a speed v in a first direction x. This is achieved with the aid of a drive vibration 14 having a frequency $\omega_A$. Movable mass structure 12 may include a drive mass 16 and a detection mass 18, a preferred vibration direction x of drive mass 16 being oriented orthogonally relative to a preferred vibration direction y of detection mass 18. As the result of mechanical coupling 20 with the aid of a spring system, a Coriolis force $F_C$ which results from a yaw rate $\Omega$ of mass structure 12 and which acts on drive mass 16 is transmitted to detection mass 18 in the direction of preferred vibration direction y of detection mass 18. Since in general the two vibration directions x, y are not precisely orthogonal, deflection 14 of drive mass 16 results in a second force component $F_Q$ (quadrature component), which is different from Coriolis force $F_C$, in preferred vibration direction y of detection mass 18. The Coriolis component and the quadrature component are phase-shifted by 90° with respect to one another, so that the two components $F_C$, $F_Q$ may be ascertained separately, in particular with the aid of demodulators 24, 26 having drive frequency $\omega_A$. Demodulator 24 generates quadrature signal 28. Demodulator 26 for detection signal 32, which is shifted by 90° with the aid of a phase modifier 27, supplies measuring signal 30, which is proportional to yaw rate $\Omega$. Detection signal 32 may be detected using an open- or closed-loop configuration. Output signal 34 of integral-action controller 36 counteracts the origination of quadrature $F_Q$ by providing an output signal 34 (quadl signal), which is converted to a voltage, to quadrature compensation electrodes 38. Using an electrode shape of appropriate design, a lateral force is generated which is proportional to deflection x, and the direction of drive vibration 14 rotates until its action of force $F^Q$ on detection vibration 40 disappears.

For the functional testing, a test signal supplier 22 is used to provide a periodic test signal 42 which has periodic pulses or a sinusoidal curve and which is fed into quadrature control loop 44 (see FIG. 1). As a result, the useful signal typically is not influenced at all, or only to a tolerable degree, so that the functional testing may be carried out continuously, i.e., on an ongoing basis, and it is not necessary to interrupt detection of the useful signal for functional testing. In a first method, test signal 42 is added to output signal 34 of integral-action controller 36. Using one of the following measures or a combination thereof, resetting of summed-up test signal 42 by controller 36 may be prevented, and complete formation of response signal 47 may be supported. For example, a frequency $\omega_T$ of test signal 42 may be selected to be greatly above a bandwidth of quadrature control loop 44. For this purpose, a band pass filter 46 may be provided at the input of controller 36. Alternatively, a time pass filter 46 may be provided at the input of controller 36 which via periodic blanking (stopping) of controller 36 acts selectively in the time range, the blanking ratio and the phase of the blanking pattern being adapted to the shape and propagation time of response signal 47.

Figure 2:
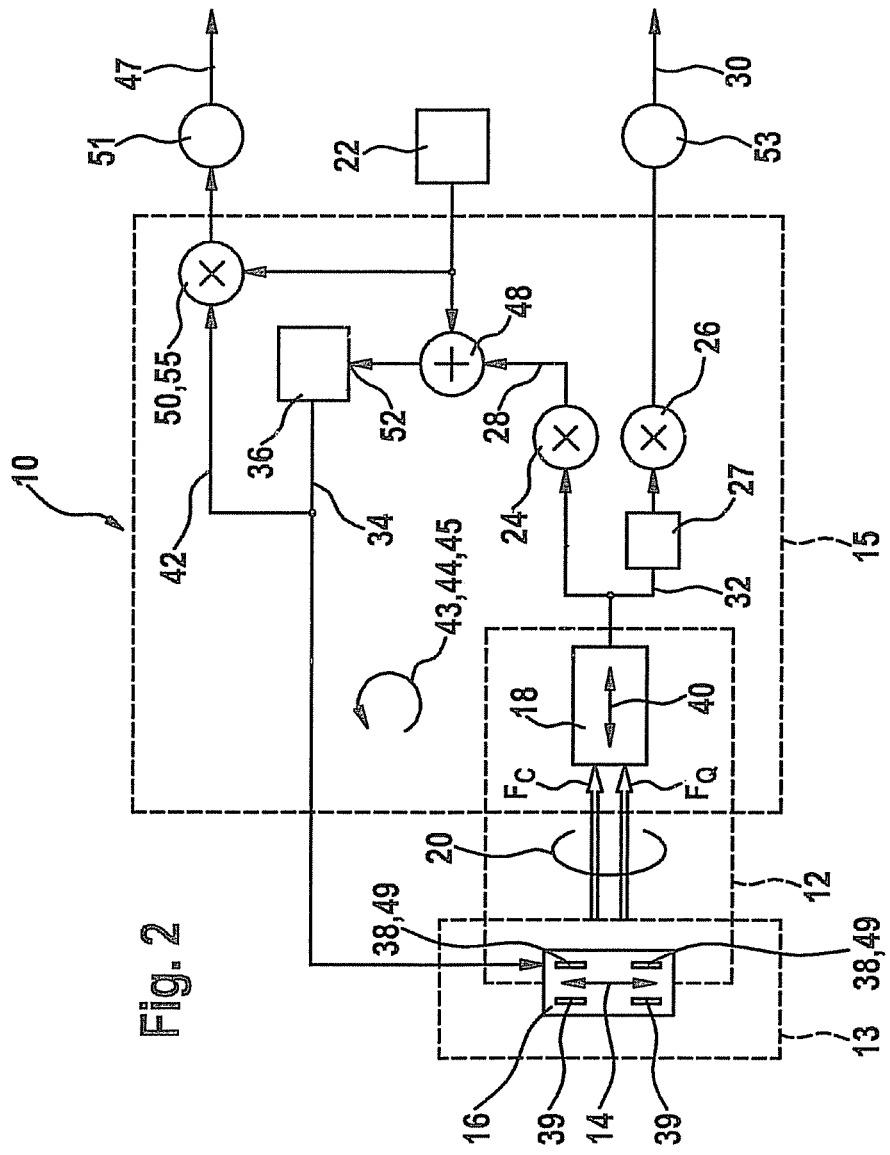

Response signal 47 may be read out after demodulation 24 of detection signal 32 into quadrature channel 28. Demodulation 55 at frequency $\omega_T$ of test signal 42 in addition to deep pass filtering 51 may supply a direct-current-like signal as response signal 47. Alternatively, the sequence of feed point 48 and readout point 50 may be interchanged (see FIG. 2). Feed point 48 for test signal 42 is then situated, for example, at input 52 of controller 36. Response signal 47 may be tapped at output 54 of controller 36, and by demodulation 55 with test signal 42 may be converted into a direct-current-like signal. For this purpose, a bandwidth of quadrature control loop 44 should be greater than frequency $\omega_T$ of test signal 42.

To achieve sufficient accuracy of the functional testing, the evaluation of response signal 47 should take into account at least all important influences on test signal 42. Response signal 47 preferably is not a function of a transient response of drive structure 12. This may be achieved by selecting test signal frequency $\omega_T$ to be sufficiently low. Response signal 47 also should not be a function of an "external" time constant, such as its clock, for example, via which the response signal is synchronized with drive vibration 14. To prevent the yaw rate measurement from being impermissibly impaired by the functional testing, any sources of error in the demodulation and the separation into the yaw rate component and the quadrature component should be taken into account. It may therefore be advantageous to select test signal frequency $\omega_T$ to be greatly above a bandwidth of an output filter 53 for yaw rate information 30 in order to separate test signal 42 and response signal 47 from useful signal 30 in terms of frequency. To avoid offset errors, expected response signal 47 in response to fed test signal 42 should be mean-value-free.

The quadrature signal is proportional to the action of force of quadrature electrodes 38, and thus to the square of the potentials of quadrature electrodes 38. Since test signal 42 at these potentials is to be added to existing controller potential 34, the relationship between a level of test signal 42 and a level (amplitude or direct current level) of response signal 47 is not linear, but instead is a function of an operating point of controller 36. The following concepts are recommended for taking the operating point dependency into account:

"Computation at propagation time" concept: The relationship between potentials at quadrature electrodes 38 and quadrature $F_Q$ generated thereby may be analytically described, and essentially is a function of a compensation capability of sensor 10. By continuous computation in a computing unit (a microcontroller, for example), a measure for the compensation capability is extracted from test signal 42 and from response signal 47. The compensation capability may be evaluated in comparison to a new-part value. One alternative concept provides that the computing unit is used for determining a level of test signal 42, based on an instantaneous operating point (quadl value), in such a way that response signal 47 always corresponds to a predetermined value which is a function of the operating point. This type of compensation advantageously results in a response signal 47 having a signal-to-noise ratio which is a function of the operating point, i.e., constant.

"Lookup table" concept: In order to take the operating point dependency of the functional testing into account, instead of a computing unit, a nonvolatile memory may be used which contains a table that is suitable and/or provided for supplying the particular expected level of response signal 47 for the operating points to be measured (quadl values). The expected level of response signal 47 may be compared to the actual measured level of response signal 47. An alternative option in this case is to dose signal 42 to be fed, corresponding to an inverse function of the operating point dependency (i.e., corresponding to an inverse operating point dependency). For this purpose, the table contains, for multiple possible operating points, a measure of a particular level of the test signal to be used which is necessary in order to provide a predetermined setpoint level of response signal 47.

A functional relationship between test signal 42 on quadrature electrodes 38 and the generated quadrature and thus, also the complexity of taking the operating point dependency into account may be simplified by an appropriate design of sensor 10. By using separate electrodes 39 for test signal feed 48 which are different from electrodes 38 for quadrature control 36, a level of response signal 47 may be achieved which is proportional to the square of fed test signal 42 (see FIG. 3). The method for computing the propagation time then requires no higher level of arithmetic operation (computing function) than multiplication. Electrodes 39 for feeding test signal 42 may be designed in such a way that a relationship between a level of test signal 42 and a level of response signal 47 is linear.

What is claimed is:

1. A method for functional testing of a yaw rate sensor, the method comprising:
    driving a movable mass of the yaw rate sensor in a first direction;
    feeding a test signal into a quadrature control loop of the yaw rate sensor at a feed point of the quadrature control loop, the quadrature control loop including an actuator to drive the movable mass in a manner to counteract movement of a detection mass of the yaw rate sensor in a second direction orthogonal to the first direction as a result of the driving of the movable mass;
    detecting a measure of movement of the detection mass in the second direction;
    feeding back a signal based on the measure of movement of the detection mass by the quadrature control loop to the actuator of the quadrature control loop; and
    reading out a response signal from the quadrature control loop at a readout location between the feed point and the actuator of the quadrature control loop from a perspective of a processing direction of the quadrature control loop.

2. The method as recited in claim 1, wherein a power spectrum of the response signal is above a bandwidth of an output filter for yaw rate information.

3. The method as recited in claim 2, wherein a frequency ($\omega_T$) of the test signal is less than an inverse control time constant of the quadrature control loop.

4. The method as recited in claim 2, wherein the test signal has a sinusoidal curve.

5. The method as recited in claim 2, wherein the test signal is selected to correspond to an inverse operating point dependency of the quadrature control loop.

6. The method as recited claim 1, wherein a power spectrum of the response signal is above a bandwidth of the quadrature control loop.

7. The method as recited in claim 6, wherein a frequency ($\omega_T$) of the test signal is less than an inverse control time constant of the quadrature control loop.

8. The method as recited in claim 6, wherein the test signal has a sinusoidal curve.

9. The method as recited in claim 6, wherein the test signal is selected to correspond to an inverse operating point dependency of the quadrature control loop.

10. The method as recited in claim 1, wherein a frequency ($\omega_T$) of the test signal is less than an inverse control time constant of the quadrature control loop.

11. The method as recited in claim 1, wherein the test signal has a sinusoidal curve.

12. The method as recited in claim 1, wherein the test signal is selected to correspond to an inverse operating point dependency of the quadrature control loop.

* * * * *